(12) United States Patent
Wolfgram et al.

(10) Patent No.: US 12,156,508 B2
(45) Date of Patent: Dec. 3, 2024

(54) PULLEY SYSTEM ALLOWING FOR PASSAGE OF OBJECT ATTACHED TO LINE

(71) Applicant: Swift Paws, Inc., Malabar, FL (US)

(72) Inventors: Meghan Wolfgram, Malabar, FL (US); John Ritter, Satellite Beach, FL (US)

( * ) Notice: Subject to any disclaimer, the term of this patent is extended or adjusted under 35 U.S.C. 154(b) by 242 days.

(21) Appl. No.: 17/718,307

(22) Filed: Apr. 11, 2022

(65) Prior Publication Data

US 2022/0232803 A1 Jul. 28, 2022

Related U.S. Application Data

(63) Continuation-in-part of application No. 16/841,596, filed on Apr. 6, 2020, now Pat. No. 11,297,801, which is a continuation-in-part of application No. 14/569,715, filed on Dec. 14, 2014, now Pat. No. 10,609,904.

(60) Provisional application No. 61/917,058, filed on Dec. 17, 2013.

(51) Int. Cl.
*A01K 15/02* (2006.01)

(52) U.S. Cl.
CPC .......... *A01K 15/027* (2013.01); *A01K 15/025* (2013.01)

(58) Field of Classification Search
CPC ............................. B65H 75/4476; A63H 21/02
See application file for complete search history.

(56) References Cited

U.S. PATENT DOCUMENTS 3,405,478 A * 10/1968 Richter .................. A61H 21/02

* cited by examiner

*Primary Examiner* — Joshua J Michener
*Assistant Examiner* — Henry Hooper Mudd
(74) *Attorney, Agent, or Firm* — Lowndes; Stephen C. Thomas; Robert Fredeking

(57) ABSTRACT

A pulley system for enabling an object attached to a line to pass around a rotating pulley at least partially enclosed by a housing, without causing the object to encounter interference from the housing structure as the object passages through. An inward beveled edge of the housing structure may act to guide the line into the pulley groove. An object passthrough window for allowing the object to pass around the pulley while the pulley is rotating, without encumbrance of the object, may comprise a substantially solid, or continuous, inner surface formed of the inward beveled edge and the pulley groove. An exemplary use of the pulley system is in drive or transfer pulleys, or both, in systems utilizing pulley arrangements: for example, in systems such as lure coursing systems that continuously loop a line having a lure attached, for the enjoyment of domesticated animals.

20 Claims, 11 Drawing Sheets

PULLEY SYSTEM ALLOWING FOR PASSAGE OF OBJECT ATTACHED TO LINE

CROSS REFERENCE TO RELATED APPLICATIONS

The present application is a continuation-in-part of U.S. patent application Ser. No. 16/841,596 entitled LURE CHASING SYSTEM, filed in the United States Patent and Trademark Office (USPTO) on Apr. 6, 2020, which published as U.S. patent publication no. US 2020-0229399 A1 on Jul. 23, 2020, the disclosure of which is incorporated herein by reference in its entirety; U.S. patent application Ser. No. 16/841,596 is a continuation in part of U.S. patent application Ser. No. 14/569,715 entitled LURE CHASING SYSTEM, filed in the USPTO on Dec. 14, 2014, which published as U.S. Patent Publication US 2015-0201586 A1 on Jul. 23, 2015 and which issued from the USPTO as U.S. Pat. No. 10,609,904 on Apr. 7, 2020, the disclosure of which is incorporated herein by reference in its entirety; U.S. patent application Ser. No. 14/569,715 claims the benefit of priority to U.S. provisional patent application 61/917,058 filed in the USPTO on Dec. 17, 2013, the disclosure of which is also incorporated herein by reference in its entirety. The contents of the foregoing patent applications, published patent applications, and issued patents are hereby incorporated by reference in their entireties.

BACKGROUND OF THE INVENTION

1. Field of the Invention

The present invention relates generally to a system and method for safely and effectively propelling a lure along a user-designed closed-loop line course and, more particularly, to a system and method for controlling movement of a lure along a user-designed closed-loop line course to provide an incentive for an animal to chase said lure around the user-designed line course.

2. Background of the Invention

Do it yourself lure coursing is an exciting new activity that provides exercise and enjoyment for domestic animals. Lure coursing involves setting up a user-defined course with a closed-loop line that has attached to it a lure. The lure is typically of a design that catches the attention of the animal as it moves, causing the animal to chase the lure around the course. The line is typically a closed-loop system that is cooperative with a drive motor and at least one transfer pulley that causes the close-loop line to move causing the affixed lure to move along the user-defined course.

The inventors have discovered that there are inherent operational problems and risks associated with existing lure coursing systems. For example, existing lure coursing systems utilize open or exposed pulley systems that require the use of cables or ropes having a substantial weight, thickness, and/or tensile strength. These systems can injure the mouth or limbs of an animal during operation. In addition, existing systems utilizing open or exposed pulleys create a substantial hazard to both the animal chasing the lure and the humans near the system, as a dangerous pinch point exists at each open or exposed pulley.

In addition, the open pulley or exposed systems typically used in existing lure coursing systems are prone to misalignment or failure when any turbulence is encountered or introduced in the line, which is actually quite frequent. Another drawback of the pulley systems of the prior art is that they do not allow for the passage of an object, such as but not limited to a lure or flag, attached to the line passing around the pulley. In the systems of the prior art, the object attached the line is impeded or may be prevented altogether from passing around the pulley because the object (for example lure) interferes with the pulley housing or support structure, or, alternatively, the object (for example lure) become entangled between the line and the pulley, causing the line to exit the pulley groove and causing the system to fail. Another main concern of conventional lure coursing systems is the fact that they utilize drive units comprising direct drive motor systems that do not allow for the implementation of safety features available to a drive unit implementing a non-direct drive system.

What is needed in the art, therefore, is a lure coursing system and method that eliminates or mitigates the numerous injury risks and aforementioned operational difficulties associated with current systems. Such a system and method would eliminate or mitigate the injury risks associated with both open or exposed pulleys and high resiliency lines traveling at high-speeds around a user-defined course, while still allowing for the unimpeded travel of an object attached to the line (for example, a lure for lure coursing) affixed to the line as it passes around the pulley.

BRIEF SUMMARY OF THE INVENTION

In one exemplary aspect of the present invention a lure coursing system is disclosed, said system comprising: (i) a drive unit disposed at a first location, said drive unit comprising a drive pulley enclosed by a drive pulley housing, said drive pulley housing including a drive pulley housing cover and drive pulley housing base, wherein said drive pulley housing cover includes an inwardly beveled transfer pulley shield and a hinge configured to allow for the opening and closing of the drive pulley housing cover without disturbance of the drive pulley, wherein when said drive pulley housing cover is in the closed position the drive pulley housing comprises a defined annular space forming a lure passthrough window that includes a substantially solid inner surface comprised of the drive pulley groove and the inwardly beveled drive pulley shield, wherein the drive pulley is operatively connected to a motor; (ii) a transfer unit disposed at a second location, said transfer unit comprising a transfer pulley enclosed by a transfer pulley housing, said transfer pulley housing including a transfer pulley housing cover and transfer pulley housing base, wherein said transfer pulley housing cover includes an inwardly beveled transfer pulley shield and a hinge configured to allow for the opening and closing of the transfer pulley housing cover without disturbance of the transfer pulley, wherein when said transfer pulley housing cover is in the closed position the transfer pulley housing comprises a defined annular space forming a lure passthrough window that includes a substantially solid inner surface comprised of the transfer pulley groove and the inwardly beveled transfer pulley shield; (iii) a lure line engaging said drive pulley and said transfer pulley so as to form a continuous loop configuration for said lure line, said lure line able to loop continuously around said drive pulley and said transfer pulley; and (iv) a lure attached to said lure line.

In another aspect, a method of animating a lure for lure coursing is disclosed, said method comprising the steps of: (i) disposing a drive unit at a first location, said drive unit comprising a drive pulley enclosed by a drive pulley housing, said drive pulley housing including a drive pulley housing cover and drive pulley housing base, wherein said drive pulley housing cover includes an inwardly beveled transfer pulley shield and a hinge configured to allow for the opening and closing of the drive pulley housing cover without disturbance of the drive pulley, wherein when said drive pulley housing cover is in the closed position the drive pulley housing comprises a defined annular space forming a lure passthrough window that includes a substantially solid inner surface comprised of the drive pulley groove and the inwardly beveled drive pulley shield, wherein the drive pulley is operatively connected to a motor; (ii) disposing a transfer unit at a second location, said transfer unit comprising a transfer pulley enclosed by a transfer pulley housing, said transfer pulley housing including a transfer pulley housing cover and transfer pulley housing base, wherein said transfer pulley housing cover includes an inwardly beveled transfer pulley shield and a hinge configured to allow for the opening and closing of the transfer pulley housing cover without disturbance of the transfer pulley, wherein when said transfer pulley housing cover is in the closed position the transfer pulley housing comprises a defined annular space forming a lure passthrough window that includes a substantially solid inner surface comprised of the transfer pulley groove and the inwardly beveled transfer pulley shield; (iii) disposing a lure line around the drive pulley and transfer pulley, said lure line engaging said drive pulley and said transfer pulley so as to form a loop configuration for said lure line, said lure line able to loop continuously around said drive pulley and said transfer pulley; (iv) affixing a lure attached to said lure line; and (v) activating the drive pulley via the drive motor to move the lure line thereby animating the lure affixed to the lure line in a continuous loop.

The drive unit may further comprise a battery electrically connected to the motor and a motor control unit. In addition, the motor control unit may include one or more transceivers, which may be configured to wirelessly communicate with a user handheld remote. The user handheld remote may be configured to provide haptic or visual feedback to the user regarding the operation of the lure coursing system. The motor control unit may also include an electronic timer configured to halt the flow of electricity to the motor after a preprogramed duration and may also include a digital stall system that halts the flow of electricity to the motor upon detection by the digital stall system of a load on the lure line exceeding a preprogramed load limit. The lure may be permanently or removably affixed to the lure line. Moreover, the drive unit and/or transfer unit may be affixed to the ground via break-away tethers configured to break apart under a predefined lateral or horizontal load.

It is a further aspect and object of the invention to provide a pulley system that allows a line to pass around a pulley while the pulley is rotating, and also, at the same time, allow an object attached to the line to pass around the pulley and through an object passthrough window in a pulley housing, such that the object passes through the object passthrough window, and through the housing, without impediment. Thus, using the inventive pulley system of the invention, a line may pass around a pulley and an object attached to the line may also pass around the pulley, and through a structure to which the pulley is attached, such as a housing, without impediment. This invention is useful, as in many cases a line passing through one or more pulleys may have an object attached that, as the object passes around the pulley or pulleys, either is impeded by the pulley supporting structure(s) (such as, for example, a pulley housing or other supporting structure), or is caused to exit the pulley groove due to the object tangling between the line and the pulley groove causing the line to jump out of the pulley groove as the line passes around the pulley. The inventive pulley system of the invention overcomes these drawbacks of the prior art.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

DETAILED DESCRIPTION OF THE INVENTION

The following documentation provides a detailed description of exemplary embodiments of the invention. Although a detailed description as provided herein contains many specifics for the purposes of illustration, anyone of ordinary skill in the art will appreciate that many variations, equivalents and alterations to the following details are within the scope of the invention. Accordingly, the following preferred embodiments of the invention are set forth without any loss of generality to, and without imposing limitations upon, the claimed invention. Thus, the scope of the invention should be determined by the appended claims and their legal equivalents, and not merely by the preferred examples or embodiments given herein.

Figure 1:
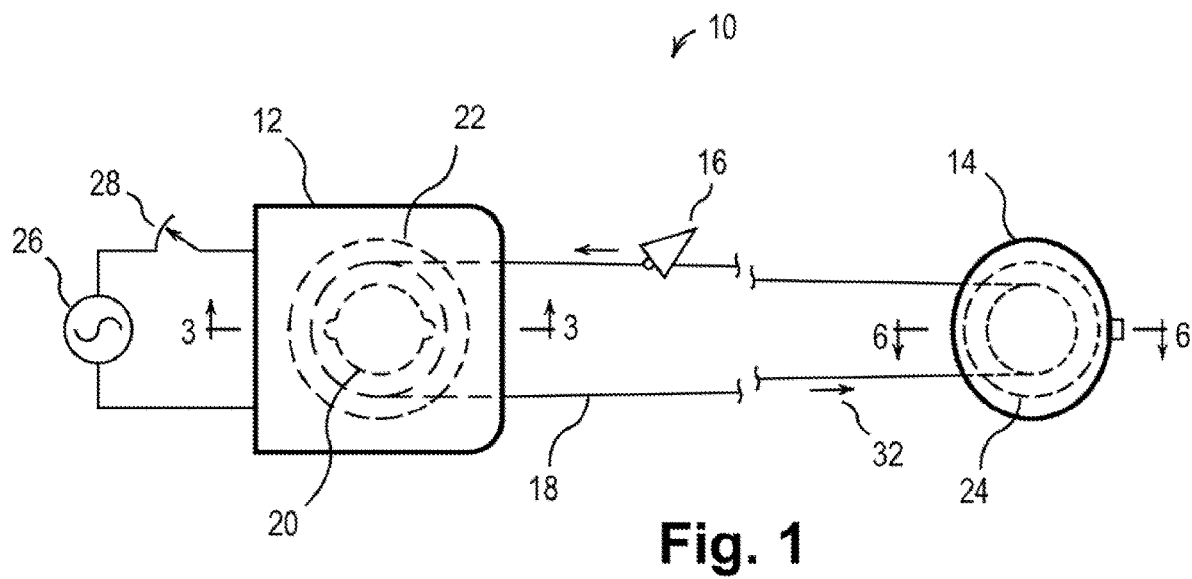
FIG. 1 is a diagrammatical top view illustration of a basic line coursing system including a drive unit and a transfer unit, in accordance with an aspect of the present invention.

Referring now to FIG. 1, a diagrammatical top view illustration of a basic lure coursing system 10 suitable for use in exercising dogs and similar domesticated animals accustomed to running, in accordance with an aspect of the present invention is shown. The basic lure coursing system 10 comprises a drive unit 12 disposed at a first location, a closed-loop lure line 18, a lure 16, and a transfer unit 14 disposed at a second location. The drive unit 12 is placed on the ground and is separated from the transfer unit 14 that is also disposed on the ground at a distance from the drive unit determined by the user. The lure line 18 is routed through the drive unit 12 and around the drive pulley 22 and through the transfer unit 14 and around the transfer pulley 24 to form a closed loop, essentially as shown.

To increase friction between the lure line 18 and the drive pulley 22 said drive pulley may be at least partially coated with a friction increasing material, which may include, without limitation, silicone, rubber, latex, silicon rubber, ethylene propylene diene monomer rubber or cork. The transfer pulley 24 may also be similarly coated.

The lure 16 may be removably or permanently attached to the lure line 18, at a location on the lure line selected by the user. The lure 16 may be removably or permanently affixed to the lure line 18 via knotting of the lure line around the lure and/or the knotting of the lure around the lure line. The lure 16 may also be affixed to the lure line via adhesives, hook and loop fasteners or other fasteners. More than one lure may be affixed to the lure line 18. The lure 16 is preferably constructed of a soft mailable material such as plastic, polyethylene, silicon, rubber or a fabric. The lure line 18 is configured into a closed loop by the user, such as by knotting a length of line so that the lure line 18 passes around both: (i) the drive pulley 22 enclosed in the drive unit 12, and (ii) a transfer pulley 24 enclosed in the transfer unit 14. The lure-line 18 may also be manufactured as a closed-loop.

The lure line 18 may be made from any material suitable to engage the drive and transfer pulley to form a closed-loop configuration and of necessary strength to withstand high-speed operation in a closed-loop configuration. Preferred materials include, without limitation, monofilament, nylon, cotton, polyester, polypropylene, polyethylene, Kevlar or any mixture thereof. Preferred lure line construction includes, without limitation, braided, double braided, solid braided, hollow braided or twisted.

The drive unit 12 includes a motor 20 that may be powered by any AC or DC electrical source. The electrical power source may be an external AC electrical source 26 and may be controlled by an electronic motor control unit 28. Alternatively, a battery 77 can be utilized to provide DC electrical power to the motor and motor control unit. Preferred batteries include lithium-ion, lithium-ion polymer (lipo), lithium, nickel metal hydride, nickel-cadmium, lead acid, lead acid gel or alkaline. The battery 77 may be rechargeable or non-rechargeable.

Figure 2:
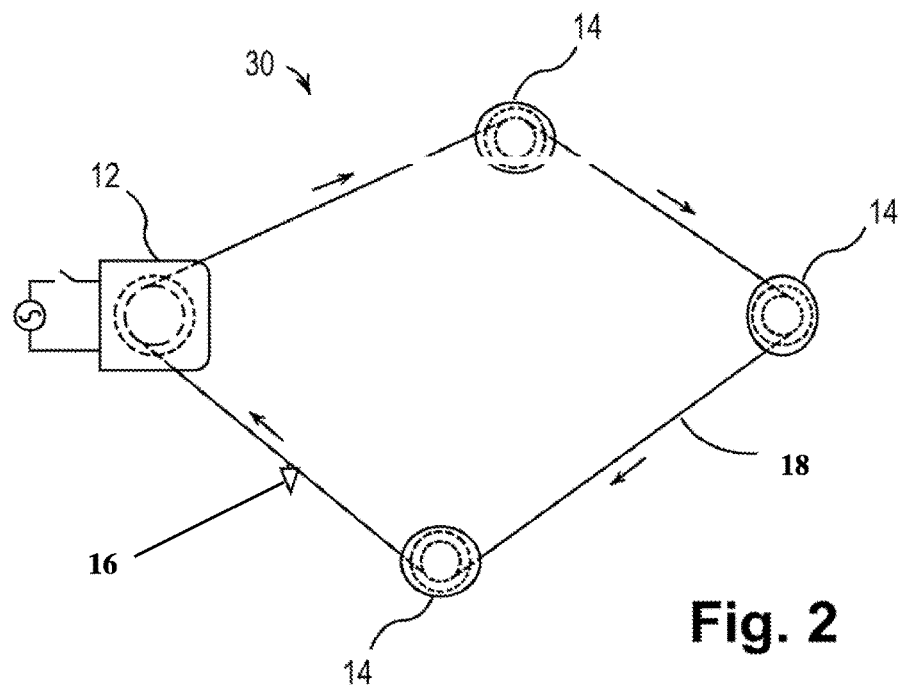
FIG. 2 is a diagrammatical top view illustration of an alternative line coursing system including a drive unit and three transfer pulley units.

FIG. 2 is a diagrammatical top view of an alternative configuration of a lure coursing system 30, in accordance with another aspect of the present invention. The lure coursing system 30 comprises the drive unit 12, a lure line 18 forming a continuous loop, the lure 16 attached to the lure line 18, and three transfer units 14 engaging the lure line 18. The lure line 18 is routed through the drive unit 12 and through each of the three transfer units 14 to form a closed loop. The length of the lure line 18 may be longer or shorter than the length of the lure line 18 in the configuration of FIG. 1. In the example shown, the drive unit 12 and the three transfer units 14 form the vertices of a four-sided polygon. It should be understood that the components of the lure coursing system 30 can be arranged in any pattern desired by the user, provided that there is space and terrain available to set up the lure coursing system 30. Configurations contemplated by the present invention include configurations utilizing one or more transfer units 14 and/or one or more drive units 12 to form any user-defined course. If one or more drive units 12 are utilized in a configuration, the operation of the drive units may be linked via wireless communications.

Figure 3:
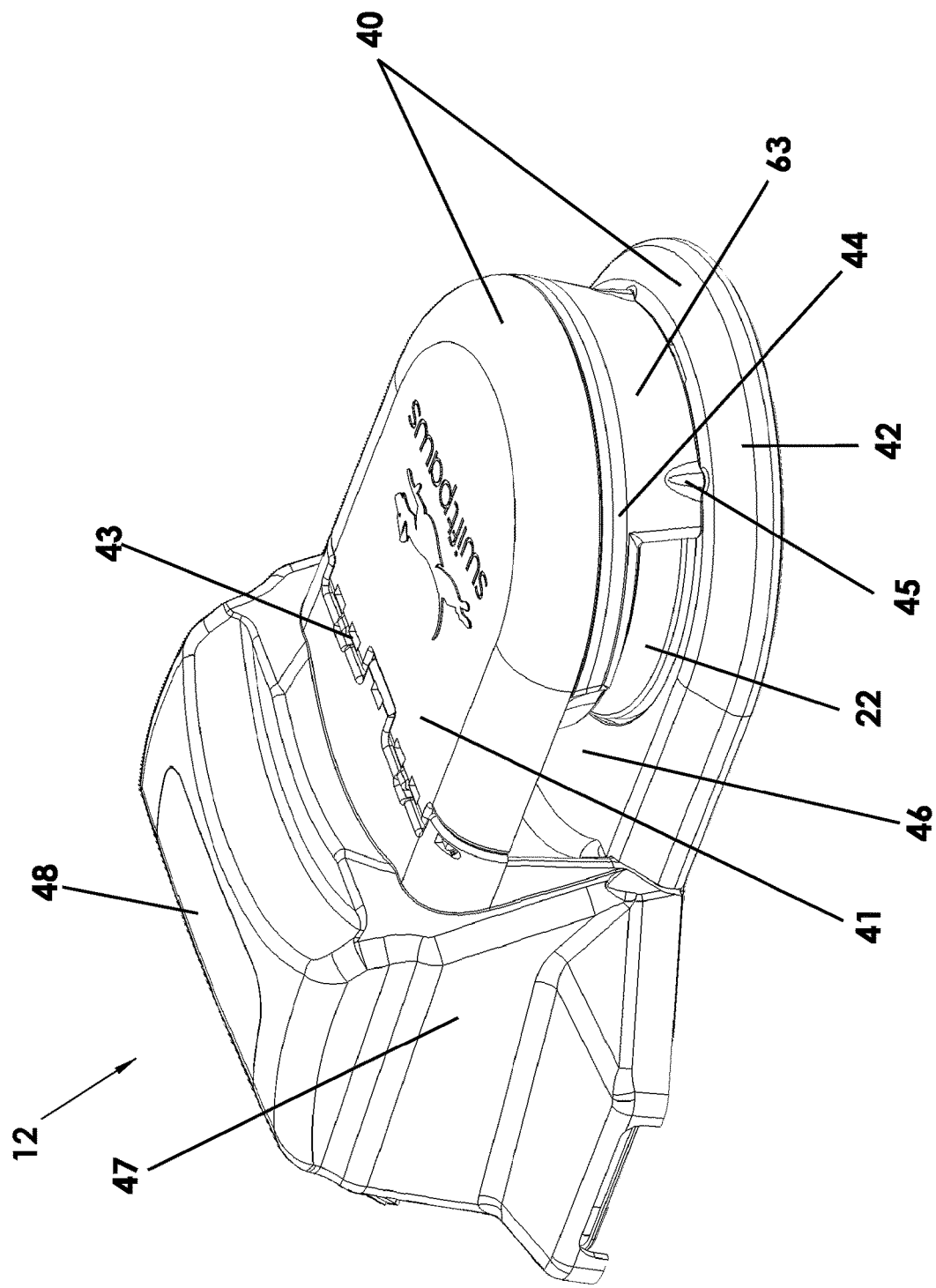
FIG. 3 is a diagrammatical front isometric view of one embodiment of the drive unit in the closed configuration in accordance with an aspect of the present invention.

Turning to FIG. 3, a front isometric diagrammatical view of a preferred embodiment of the drive unit 12 is shown. The drive unit includes a drive pulley 22 enclosed in a drive pulley housing 40. The drive pulley housing is comprised of a drive pulley housing cover 41 and a drive pulley housing cover base 42. The drive pulley housing cover base 42 may solid or may be hollow with a defined interior space. The drive pulley housing cover 41 contains a hinge 43 configured to allow the drive pulley housing cover to open and close without disturbing the drive pulley 22. The drive pulley housing cover also contains a drive pulley shield 44 that partially encloses the drive pulley 22 when the drive pulley housing cover 41 is in the closed position. When in the closed position, the drive pulley housing cover 41 is removably secured to the drive pulley housing cover base 42 by one or more releasable fasteners 45. Exemplary releasable fasteners include, without limitation, a hook-and-loop fastener, latch, thumbscrew, friction-fit coupling, pin or a combination thereof. The one or more releasable fasteners 45 may also be an opposite polarity magnet pair. Exemplary magnets are neodymium or other rare-earth magnets. When in the closed position, the drive pulley housing cover 41, the drive pulley shield 44 and drive pulley housing base 42 enclose the drive pulley 22, thereby eliminating or mitigating the dangers associated with an open pulley system. When the drive pulley housing cover 41 is in the closed position, the drive pulley housing 40 includes a defined annual space forming a lure passthrough window 46 that allows the lure to pass around the enclosed drive pulley 22 without disengagement from the drive pulley and without impediment from the drive pulley housing 40. Also shown is the motor housing 47 and portable power source access door 48. The drive pulley housing 40 and motor housing 47 may be constructed of any suitable material of necessary rigidity and strength. In a preferred embodiment, the drive pulley housing 40 and motor housing 47 are constructed from plastic material. The drive pulley 22 may also be constructed of any suitable material of necessary rigidity and strength, including without limitation, PVC plastic or other high strength plastics such as polyamide or glass-filled plastics.

The hinge 43 is configured such that the lure line cannot become stuck or trapped within any spaces created in the drive pulley housing cover 41 by said hinge. In a preferred embodiment, all spaces in the drive pulley housing cover 41 created by the hinge 43 are smaller than the diameter of the lure line 18. In addition, the edges of all spaces created by the hinge 43 in the drive pulley housing cover 41 may be beveled to reduce edges upon which the lure line could become stuck or trapped. In addition, the hinge 43 mechanism may be external to the lure passthrough window 46.

Figure 4:
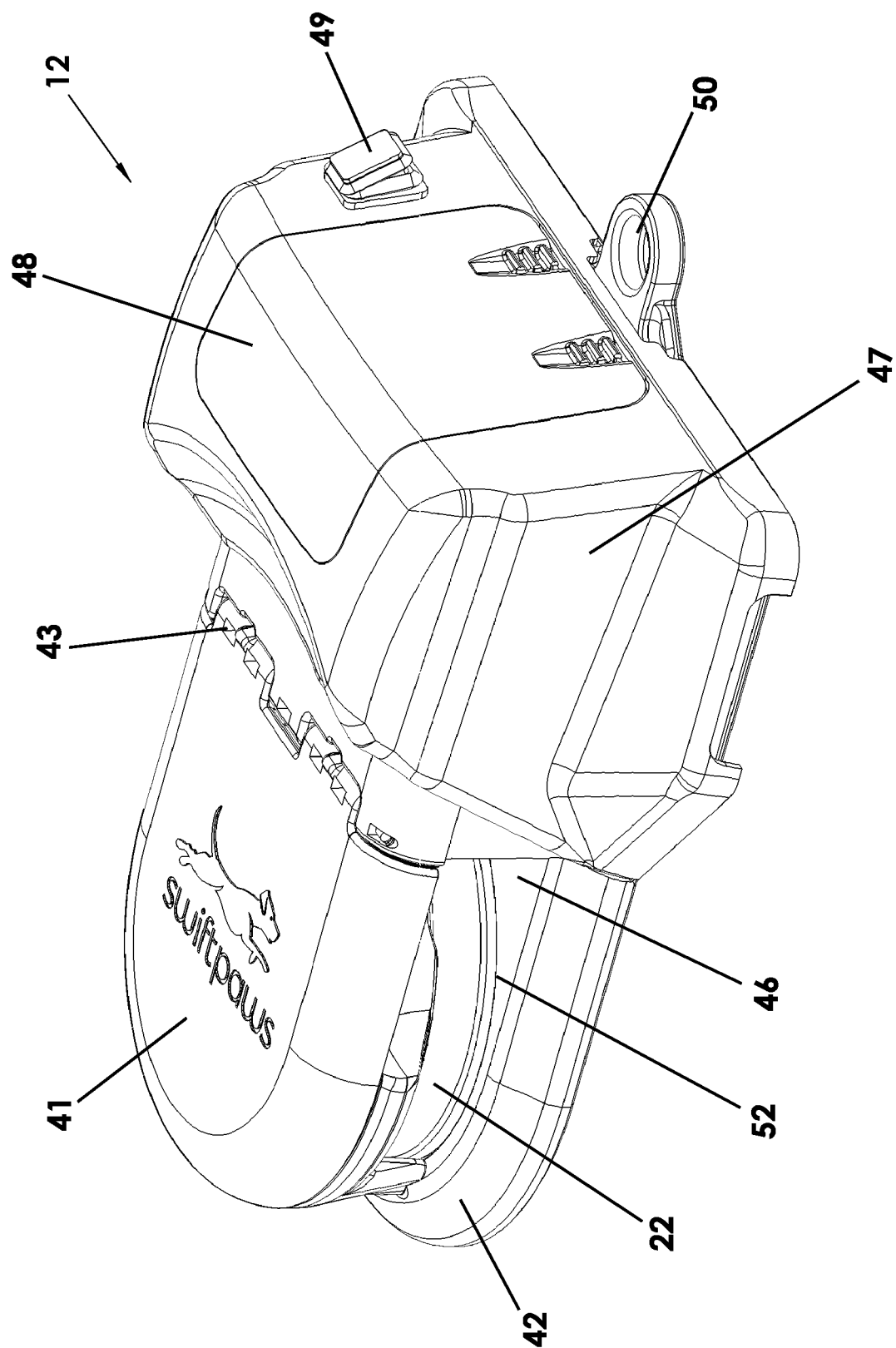
FIG. 4 is a diagrammatical rear isometric view of an embodiment of the drive unit of FIG. 3 in the closed configuration.

FIG. 4 is a rear isometric diagrammatical view of the drive unit 12 of FIG. 3. The rear of the motor housing 47 contains a power source access door 48 for the insertion and storage during operation of a battery. Also shown is a power switch 49. The drive unit 12 further includes an anchor point 50 to affix the drive unit to the ground at a location desired by the user. The drive unit 12 may be removably or permanently affixed to the ground. In an exemplary embodiment, the drive unit 12 is removably affixed to the ground via the anchor point 50 via the use of break-away tethers configured to break apart under a predefined lateral or horizontal load, said load being greater than the load placed on the anchor point 50 during normal operation of the lure coursing system. Through the use of breakaway tethers, the drive unit 12 can release from the ground upon the assertion of a lateral or horizontal load that is hazardous to an animal or human user. The break-away tethers may be operatively connected to any known means of anchoring an object to the ground, including, without limitation, a ground stake, ground anchor or weight. In another aspect, the drive unit 12 may be attached to the ground via the anchor point 50 via non-breakaway tethers or elastic tethers.

Figure 5:
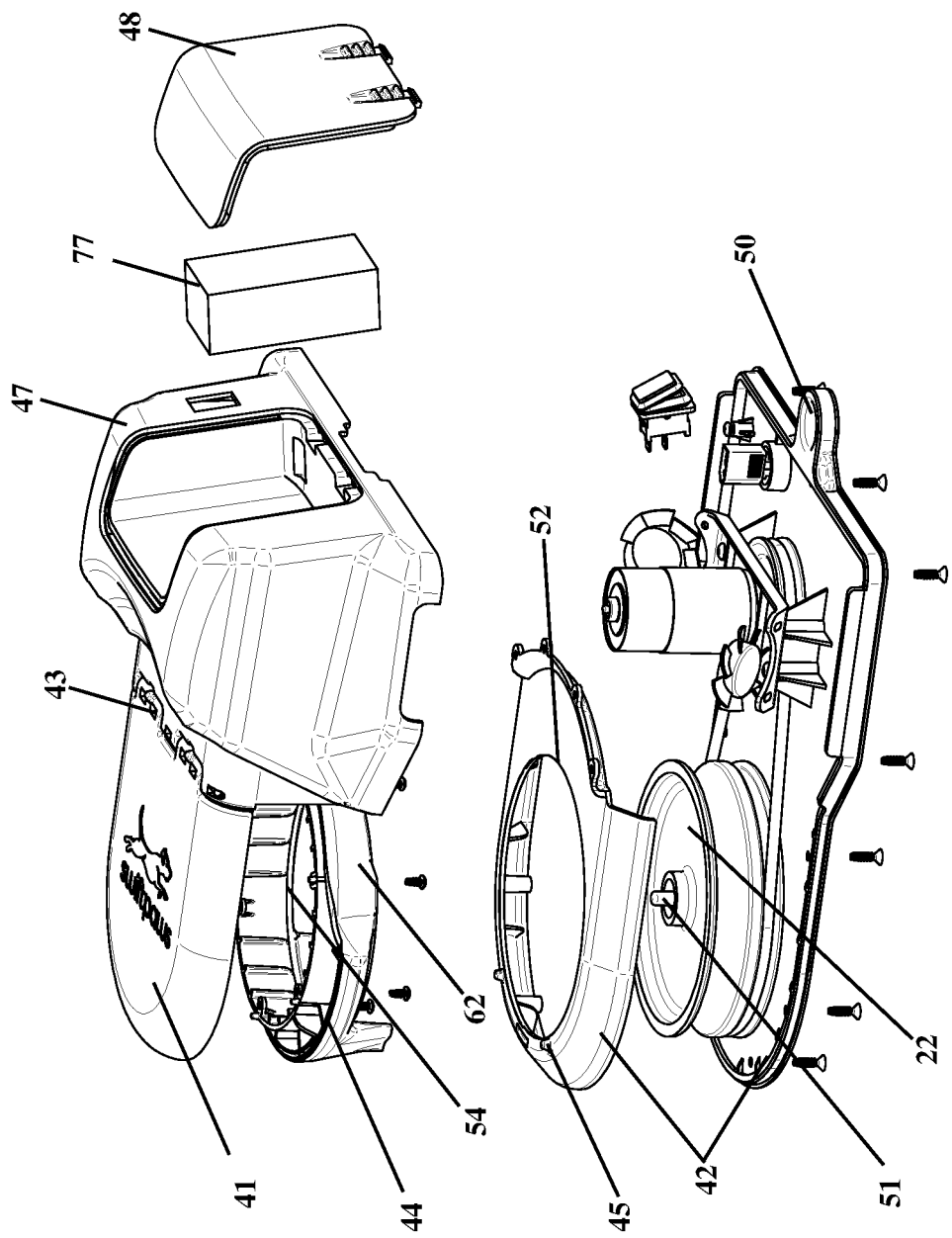
FIG. 5 is a diagrammatical exploded view of an embodiment of the drive unit of FIG. 3.

As shown by FIG. 5, an exploded diagrammatical view of the drive unit 12 of FIG. 3 and FIG. 4, the drive pulley 22 is affixed to a support shaft 51 connected to the drive unit cover base 42. The drive unit cover base 42 includes an annular recess 52 into which the drive pulley 22 rests. The annular recess 52 is of a diameter just larger than the diameter of the drive pulley 22 creating a gap 53 between the drive pulley 22 and the walls of the annular recess 52 such that the drive pulley can rotate unimpeded within the annular recess. The gap 53 is kept as small as practical, in accordance with manufacturing tolerance, while providing adequate space for free rotation of the drive pulley 22 within the annular recess 52. In aspects where the drive unit cover base is hollow, the annular recess 52 may alternatively be an annular cutout in the top section of drive unit cover base 42 that allows the drive pulley 22 to sit partially within the hollow defined area of drive unit cover base.

The drive pulley housing cover 41 also includes a circular drive pulley shield 44 that is affixed to the bottom of the drive pulley housing cover. The drive pulley shield's 44 inner diameter is just larger than the diameter of the drive pulley 22 creating a space 57 (shown on FIG. 7) between the drive pulley and the interior wall 54 of the drive pulley shield such that the drive pulley 22 can rotate unimpeded within the drive pulley shield 44. The space between the interior wall of the drive pulley shield 54 and the drive pulley 44 is kept as small as practical, in accordance with manufacturing tolerance, while providing adequate space for free rotation of the drive pulley 22 within the drive pulley shield 44.

A substantial portion of the drive pulley shield's outer external surface 62 is an inwardly beveled shape. The inwardly beveled shape of the external surface 62 of the drive pulley shield exists for less than the entire circumference of the drive pulley shield 44. Exemplary portions of the circumference that include an inwardly beveled shape include, without limitation, one-half, two-thirds, three-quarters or four-fifths of the circumference of the drive pulley shield 44. The remaining circumference of the exterior surface of the drive pulley shield is not of a an inwardly beveled shape and instead forms an annular vertical solid surface 63 (shown in FIGS. 3, 7 and 8) that acts as a safety guard for the front section of the drive pulley 22.

Figure 6:
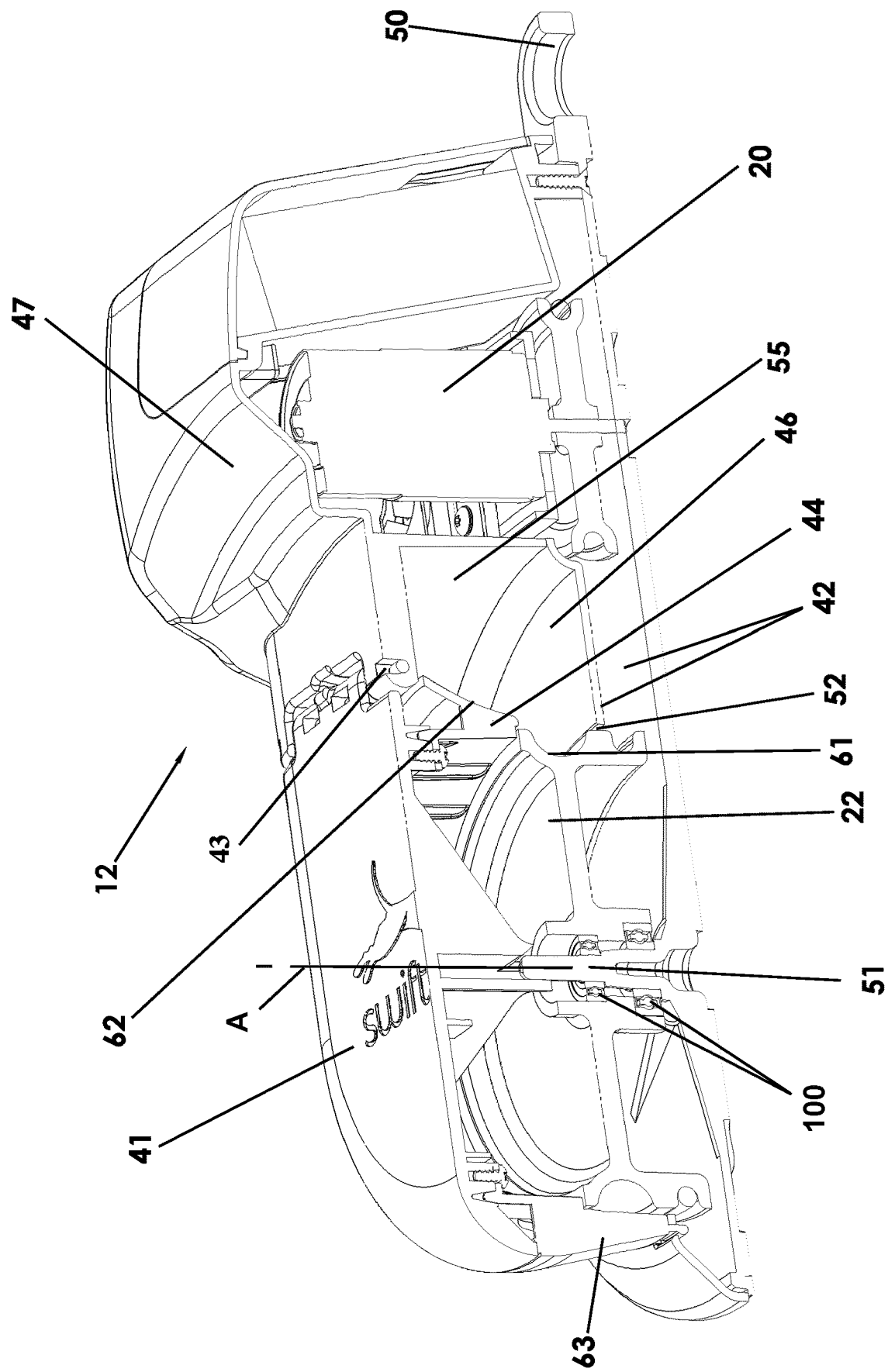
FIG. 6 is a diagrammatical cutaway view of an embodiment of the drive unit of FIG. 3 in the closed configuration.

FIG. 6. is a cutaway view of the drive unit 12 of FIGS. 3, 4 and 5 with the drive pulley housing cover in the closed position. In this closed position the drive pulley shield 44 with its inwardly beveled exterior surface 62, the drive pulley groove 61 and the annular recess 52 create a substantially solid surface 56 (shown in FIG. 7) that forms the inner side of the annular shaped lure passthrough window 46. The top section of the substantially solid inner surface 56 is formed by the drive pulley shield's inwardly beveled exterior surface 62. The lower section of the substantially solid inner surface 56 is formed by the groove of the drive pulley 61. The outer surface 55 of the annular shaped lure passthrough window is formed by a solid surface, which in a preferred embodiment, is formed by the wall of the motor housing 47. In other embodiments, the outer surface 55 of the annular shaped lure passthrough window may be any solid surface. The substantially solid inner surface 56 and solid outer surface 55 of the annular lure passthrough window are the same height or of approximately the same height. The height and width of the annular lure passthrough window 46 are configured to ensure that the lure can enter and exit the drive unit housing 40 without impediment as said lure travels around the drive pulley 22 and through the lure passthrough window 46. In addition, the substantially solid surface 56 formed by coalescence of the drive pulley shield's inwardly beveled exterior surface 62, the drive pulley groove 61 and the annular recess 52 serves to ensure that the lure line cannot "ride up" from the groove of the drive pulley 61 for any substantial period of time, which if occurred, would cause the lure line to permanently disengage from the drive pulley and thus hinder operation of the system. Even in the unlikely event that substantial turbulence introduced to the lure line causes said lure line to disengage from the drive pulley groove 61, the inwardly beveled exterior surface of the drive pulley shield 62 causes the lure line to rapidly reengage the drive pulley 22 via the drive pulley groove 61 without user intervention. Moreover, at the location the lure 16 is affixed to the lure line 18 the uniformity of the lure line is often destroyed, thus increasing the probability that the lure line will disengage from the drive pulley groove 61 at the moment the lure passes around the drive pulley. The substantially solid surface 56 of the inner wall of the annular lure passthrough window 46 ensures the lure line will reengage the drive pulley if disengaged, while the shape of the annular lure passthrough window 46 allows the lure to travel through the drive unit housing 40 unimpeded. In one aspect, the outer wall of the lure passthrough 55 may not be annular and may be comprised of a flat solid surface.

Figure 7:
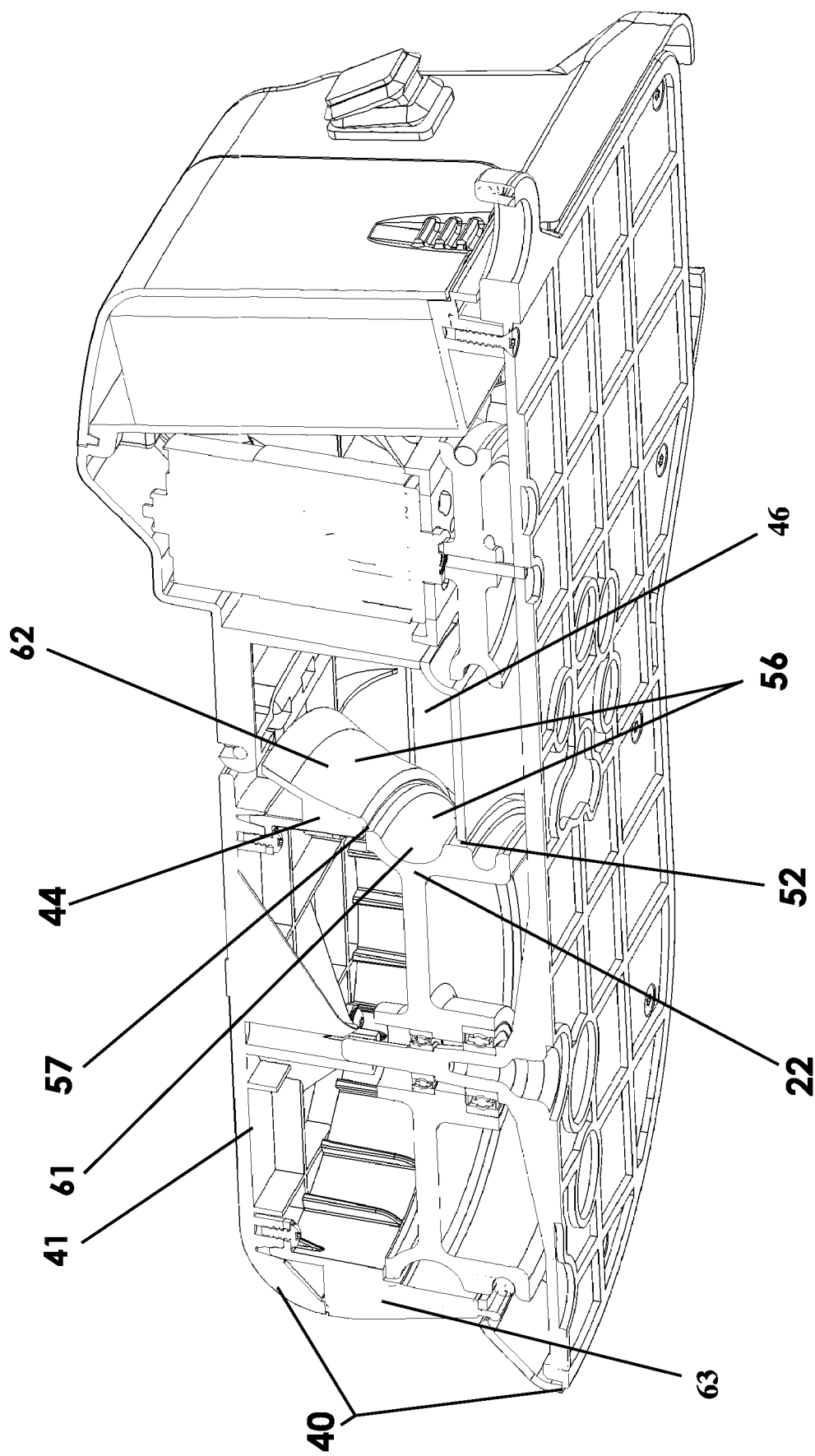
FIG. 7 is an additional diagrammatical cutaway view of an embodiment of the drive unit of FIG. 3 in the closed configuration.

The substantially solid surface 56 formed by the coalescence of the drive pulley shield 44, the drive pulley 22 and the annular recess 52 when the drive unit cover 41 is in the closed position is shown in FIG. 7. The inwardly beveled shape of the external surface drive pulley shield 62 forces the lure line 18 (not shown) back into the drive pulley groove 61 in the event the lure line escapes the drive pulley. In a preferred embodiment, the gap 52 between the annular recess and the drive pulley 22 and the gap 57 between the drive pulley shield 44 and the drive pulley 22 is smaller than the diameter of the lure line.

Figure 8:
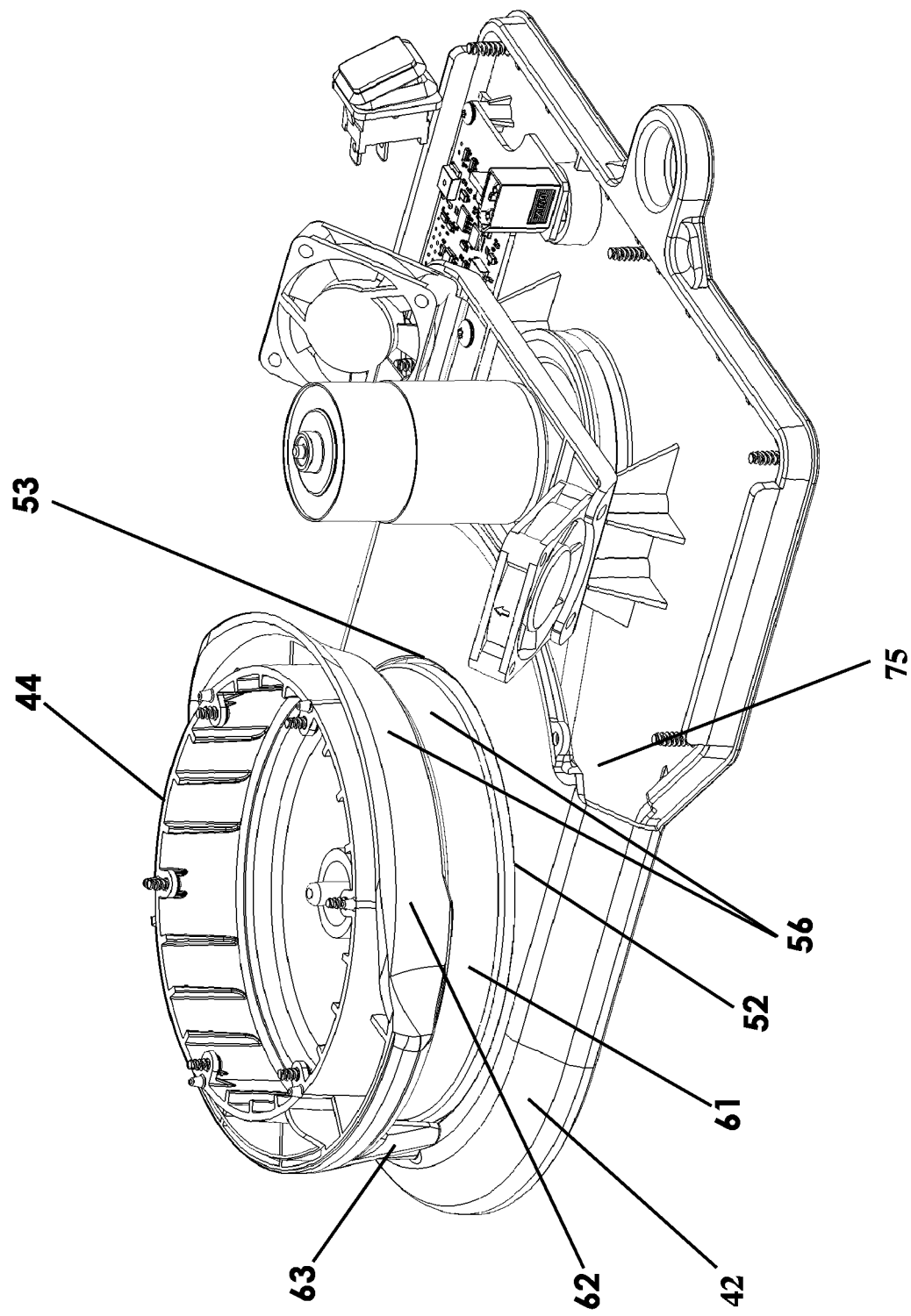
FIG. 8 is an internal diagrammatical view of an embodiment of the drive unit of FIG. 3.

The drive pulley shield's 44 inwardly beveled exterior surface 62 subsisting around a portion of the drive pulley shield's circumference and the drive pulley shield's annular vertical solid surface 63 acting as a protective guard are shown in FIG. 8. This figure also shows the substantially solid surface 56 formed by the coalescence of the drive pulley shield's inwardly beveled exterior surface 62, the drive pulley groove 61 and the annular recess 52 when the drive unit housing cover 41 is in the closed position. Shown also is the defined space 75 created by the hollow drive unit cover base 42 in one aspect of the invention.

Figure 9:
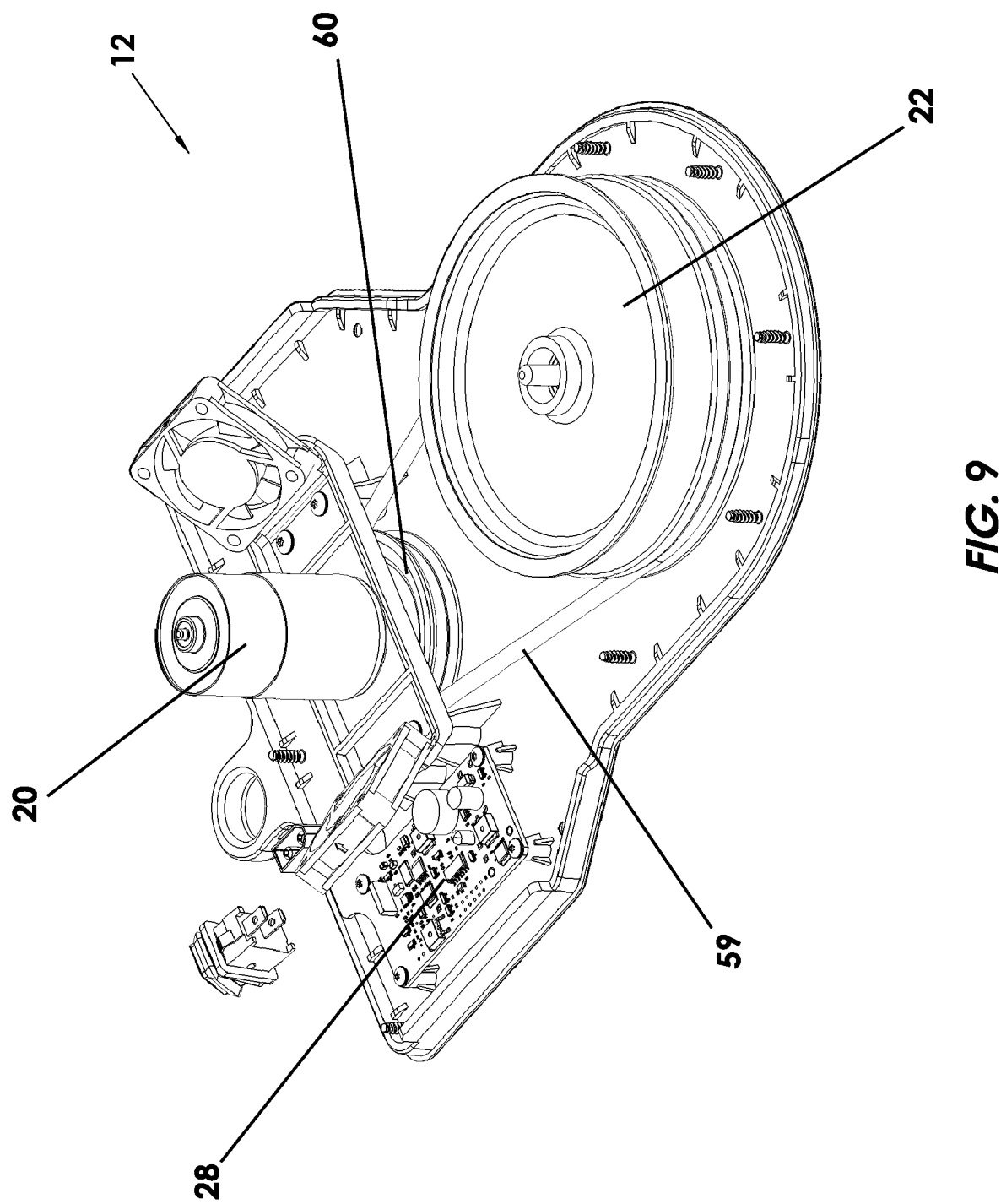
FIG. 9 is an additional internal diagrammatical view of an embodiment of the drive unit of FIG. 3.

The drive unit 12 also includes a motor 20 and a motor control unit 28 as shown in FIG. 9. The motor control unit and the motor are electrically connected to an electrical power source. The motor may be reversable and may be configured for variable speed operation. The motor 20 is operatively connected 59 to the drive pulley 22 via any means known in the art, including without limitation, a belt drive, gear drive, direct drive or indirect drive. In a preferred embodiment, the motor 20 is operatively connected to the drive pulley 22 via a drive belt 59 engaging both the drive pulley and a second pulley 60 directly connected to the motor 20. The drive belt may be configured to fail (break) if more than a predefined load limit is placed on said drive belt. In one aspect, the drive unit is configured for "under drive" implementation, where the second pulley 60 and drive belt 59 are disposed within a hollow space defined within a hollow drive unit cover base 42.

In a preferred embodiment, the motor control unit 28 includes one or more transceivers configured to wirelessly communicate with a remote control, smart phone or other wireless communication device. The motor control unit may also be configured to halt the flow of electricity to the motor 20 after the conclusion of a predetermined system run time. In addition, the motor control 28 unit may further comprise a digital stall system that halts the flow of electricity to the motor 20 upon detection by the motor control unit of a load on the lure line exceeding a preprogramed load limit.

The wireless remote control may be configured to provide haptic or visual feedback regarding the operation of the lure coursing system, including information relating to run time, errors or low battery alerts.

Figure 10:
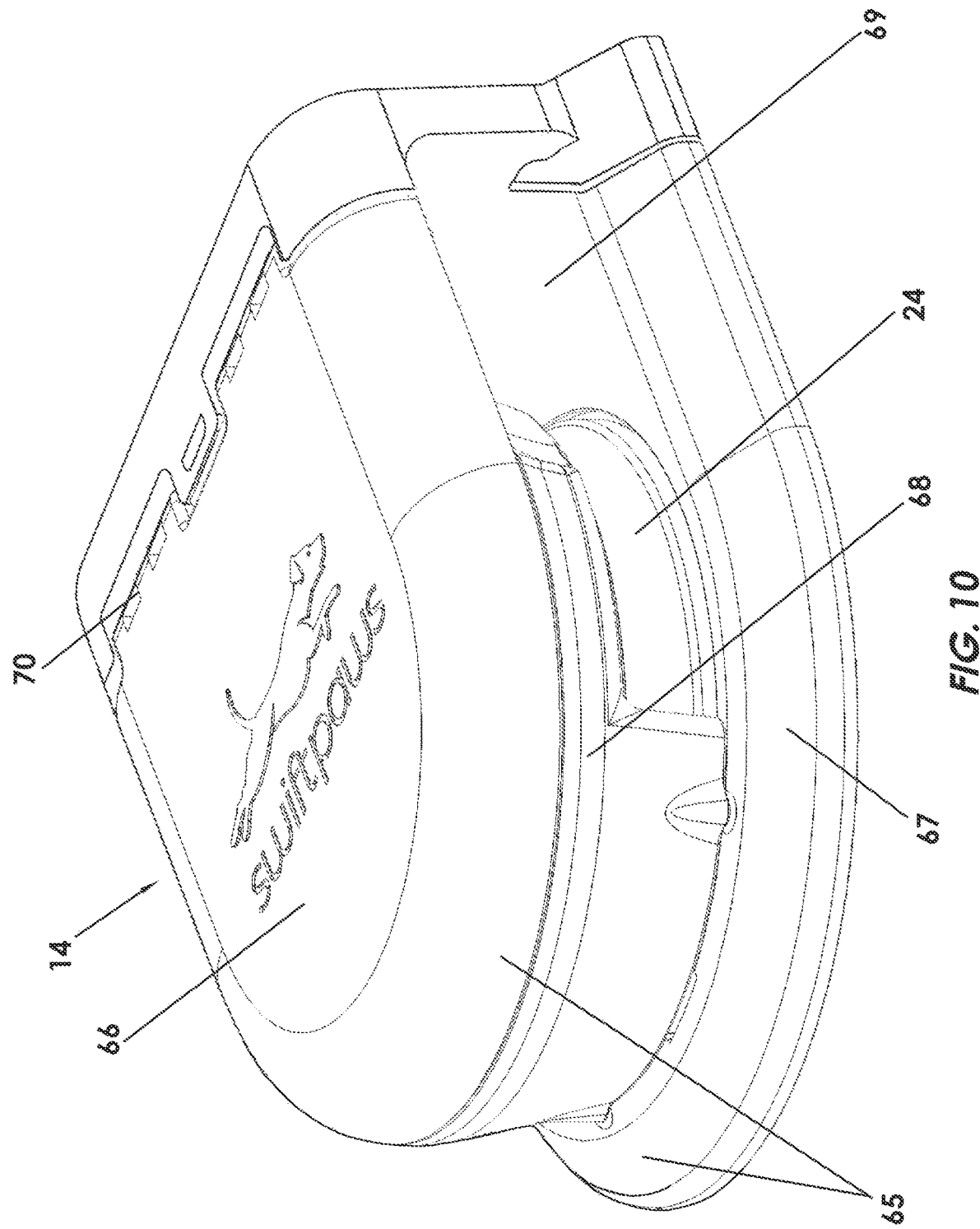
FIG. 10. is a diagrammatical front isometric view of one embodiment of the transfer unit in the closed configuration in accordance with an aspect of the present invention.

A transfer unit 14 in a closed configuration according to a preferred embodiment is shown in FIG. 10, a diagrammatical front isometric view. The transfer unit 14 includes a transfer pulley 24 enclosed in a transfer pulley housing 65. The transfer pulley housing is comprised of a transfer pulley housing cover 66 and a transfer pulley housing cover base 67. The transfer pulley housing cover 66 contains a hinge 70 configured to allow the transfer pulley housing cover to open and close without disturbing the transfer pulley 24. The transfer pulley housing cover also contains a transfer pulley shield 68 that partially encloses the drive pulley 24 when the drive pulley housing cover 66 is in the closed position. When in the closed position, the transfer pulley housing cover 66 is removably secured to the transfer pulley housing cover base 67 in the same manner as the drive unit 12. When in the closed position, the transfer pulley housing cover 66 and transfer pulley housing base 67 enclose the drive pulley 24, thereby eliminating or mitigating the dangers associated with an open pulley system. When in the closed position, the transfer pulley housing cover 66 and drive pulley housing base 67 form a defined enclosed area forming an annular lure passthrough window 69 that allows the lure to pass around the enclosed transfer pulley 24 without impediment from the transfer pulley housing 65. In certain aspects, the transfer pulley housing cover base 67 may be hollow and includes a defined enclosed area. The hinge 70 disposed within the transfer pulley housing cover 66 is of identical design to the hinge 43 of the drive pulley housing cover 41.

Figure 11:
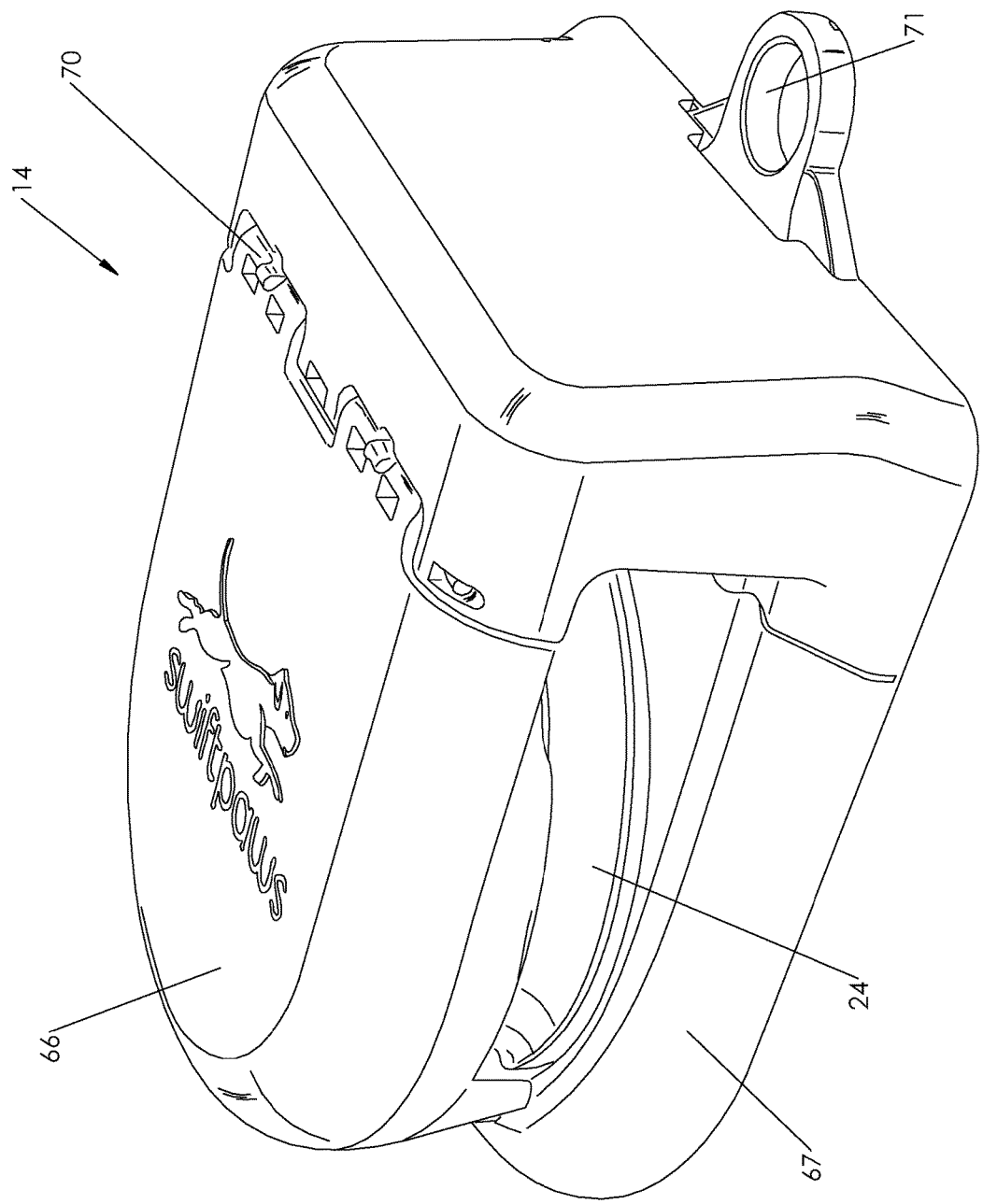
FIG. 11 is a diagrammatical rear isometric view of an embodiment of the transfer unit of FIG. 10 in the closed configuration.

FIG. 11 is a rear isometric diagrammatical view of the transfer unit of FIG. 10. Like the drive unit 12, the transfer unit 14 also includes an anchor point 71 to affix the transfer unit to the ground at a location desired by the user. The transfer unit 14 may be removably or permanently affixed to the ground. In an exemplary embodiment, the transfer unit 14 is removably affixed to the ground via the anchor point 71 via the use of break-away tethers configured to break apart under a predefined lateral or horizontal load, said load being greater than the load placed on the anchor point 71 during normal operation of the lure coursing system. Through the use of breakaway tethers, the transfer unit 14 can release from the ground upon the assertion of a lateral or horizontal load that is hazardous to an animal or human user. In another aspect, the transfer unit 14 may be attached to the ground via the anchor point 71 via non-breakaway tethers or elastic tethers.

Figure 12:
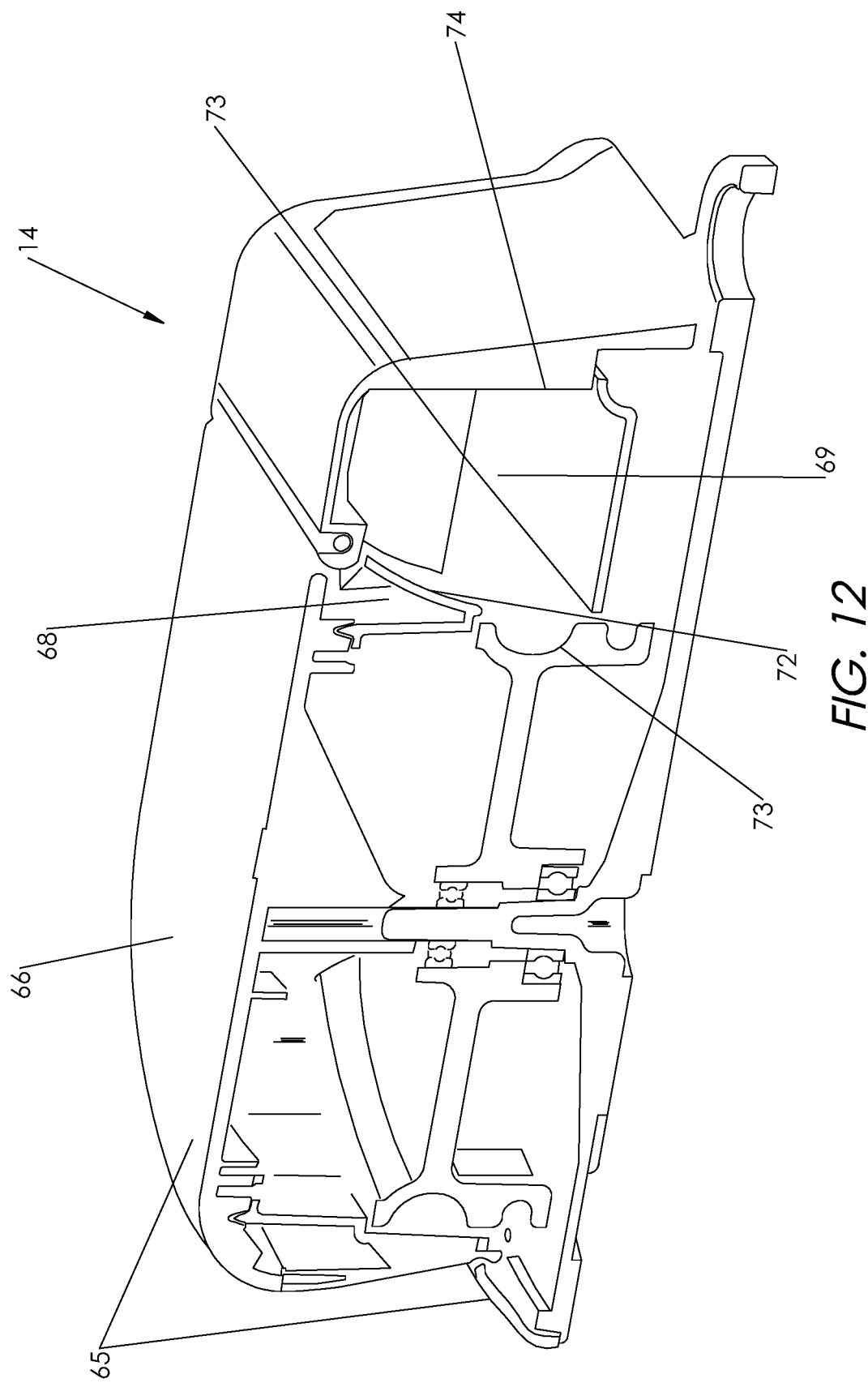
FIG. 12 is a diagrammatical cutaway view of an embodiment of the transfer unit of FIG. 10 in the closed configuration.

As seen in FIG. 12, the transfer unit 14 includes a transfer pulley shield 68 identical in shape and size to the drive unit pulley shield 44. When the transfer pulley housing cover 66 is in the closed configuration, the transfer pulley housing 65 includes an identical lure passthrough window 69 to the lure pass through window 46 found in the drive unit 12. Like the drive unit lure pass through window 46, a substantially solid interior surface is formed in the transfer unit lure pass through lure passthrough window 69 by the coalescence of the transfer pulley shield's inwardly beveled external surface 72, the transfer pulley groove 73 and the transfer pulley housing cover base annular recess 76 when the transfer unit cover 66 is in the closed position. The exterior wall 74 of the transfer unit passthrough window 69 is of identical specifications to the drive unit passthrough window exterior wall 55.

In another aspect of the invention a method of animating a lure along a user-defined closed loop lure course is provided. A user, via the use of one or more drive units 12 and one or more transfer units 14 can animate a lure along a multitude of disparate lure coursing courses for the exercise and enjoyment of domesticated animals. The method comprises the steps of: (i) disposing a drive unit 12 at a first location, said drive unit comprising a drive pulley 22 enclosed by a drive pulley housing 40, said drive pulley housing including a drive pulley housing cover 41 and drive pulley housing base 42, wherein said drive pulley housing cover includes an inwardly beveled transfer pulley shield 44 and a hinge 43 configured to allow for the opening and closing of the drive pulley housing cover without disturbance of the drive pulley, wherein when said drive pulley housing cover 41 is in the closed position the drive pulley housing 40 comprises a defined annular space forming a lure passthrough window 46 that includes a substantially solid inner surface 56 comprised of the drive pulley groove 61 and the inwardly beveled drive pulley shield 62, wherein the drive pulley is operatively connected to a motor 20; (ii) disposing a transfer unit 14 at a second location, said transfer unit comprising a transfer pulley 24 enclosed by a transfer pulley housing 65, said transfer pulley housing including a transfer pulley housing cover 66 and transfer pulley housing base 67, wherein said transfer pulley housing cover includes an inwardly beveled transfer pulley shield 68 and a hinge 67 configured to allow for the opening and closing of the transfer pulley housing cover without disturbance of the transfer pulley, wherein when said transfer pulley housing cover 66 is in the closed position the transfer pulley housing 65 comprises a defined annular space forming a lure passthrough window 69 that includes a substantially solid inner surface comprised of the transfer pulley groove 73 and the inwardly beveled transfer pulley shield 68; (iii) disposing a lure line 18 around the drive pulley 22 and transfer pulley 24, said lure line engaging said drive pulley 22 and said transfer pulley 24 so as to form a loop configuration for said lure line 18, said lure line able to loop continuously around said drive pulley and said transfer pulley; (iv) affixing a lure 16 to said lure line 18; and (v) activating the drive pulley 22 via the drive motor 20 to move the lure line 18 thereby animating the lure 16 affixed to the lure line in a continuous loop.

Configurations contemplated by the present method include configurations utilizing one or more transfer units 14 and/or one or more drive units 12 to form any user-defined course. If one or more drive units 12 are utilized in a configuration, the operation of the drive units may be linked via wireless communications.

In a preferred embodiment, the drive motor 20 is activated via the motor control unit 28 which includes one or more transceivers configured for wireless communication with a handheld wireless remote control. In addition, the one or more drive units 12 and one or more transfer units 14 are affixed to the ground via break-away tethers configured to break apart under a predefined lateral or horizontal load. The break-away tethers are operatively connected to any known means of anchoring an object to the ground, including, without limitation, a ground stake, ground anchor or weight. In another aspect, the drive unit 12 and/or transfer unit 14 may be attached to the ground via their respective anchor points via non-breakaway tethers or elastic tethers.

It is a further object of the invention, to provide a pulley system that allows a line to pass around a pulley while the pulley is rotating, and also, at the same time, allow an object attached to the line to pass around the pulley and through an object passthrough window in a pulley housing, such that the object passes through the object passthrough window without impediment. Thus, using the inventive pulley system of the invention, a line may pass around a pulley and an object attached to the line may also pass around the pulley, and through a structure to which the pulley is attached, such as a housing, without impediment. This invention is useful, as in many cases a line passing through one or more pulleys may have an object attached that, as the object passes around the pulley, either is impeded by the pulley supporting structure (such as, for example, a pulley housing or other supporting structure), or is caused to exit the pulley groove due to the object tangling between the line the pulley groove causing the line to jump out of the pulley groove as the line passes around the pulley. The inventive pulley system of the invention overcomes these drawbacks of the prior art.

Referring now to FIGS. 4-8, a non-limiting exemplary use case of the pulley system of the invention, namely a drive pulley for a lure coursing system, is shown and is also described above. In a more general characterization of an embodiment of the pulley system of the invention, the inventive pulley system may be described as a pulley system for allowing passage of an object (which may be any object, such as, for example, a lure depicted as item 16 of FIGS. 1 and 2) attached to a line 18 (see FIGS. 1 and 2) passing around a pulley 22, the pulley system comprising: a pulley 22 rotatably attached to a structure such as a housing structure (such as, in the example depicted in FIGS. 4-8, the combination of housing cover 41 and housing base 42) via a rotatable attachment (such as, for example, bearings 100 enabling pulley 22 to rotate relative to the housing structure either freely, or as driven by an operative drive motor), pulley 22 having an axis of rotation A, pulley 22 comprising an outer circumference groove 61 for retaining a line passing around pulley 22 while pulley 22 is rotating about its axis of rotation A; and a structure forming an object passthrough window (shown in exemplary fashion as item 46 in FIG. 4) adjacent to the pulley outer circumference groove 61 for allowing passage of an object (such as item 16) attached to line 18 through object passthrough window (an exemplary object passthrough window is depicted as item 46 in FIGS. 4-8) as line 18 passes around pulley 22 while pulley 22 is rotating. It is to be noted that the shape of object passthrough window 46 (and also, in a transfer pulley embodiment, 69 in FIGS. 10 and 12) depicted in the drawings is exemplary only, and that the shape of the object passthrough window may be any shape as may be required to allow the passage of a particular object 16 through the object passthrough window (such as 46 and 69), and thus around pulley 22, as pulley 22 is rotating, without impediment of object 16.

Object passthrough window 46 (or 69) may be comprised of one or a plurality of surfaces in combination that form an object passthrough window (such as 46 or 69) allowing the passage of an object 16 through an object passthrough window (such as 46 or 69), and thus around pulley 22, as pulley 22 is rotating, without impediment of object 16. Thus, the object passthrough window (such as 46 or 69) may vary in size and shape, depending upon the size, shape, material composition or configuration of any desired object 16, which may vary from use case to use case. Object 16 may thus be any object, of any shape, size, material composition or configuration of object that is desired to be attached to line 18 (see FIGS. 1 and 2). In embodiments, the housing structure may enclose at least a portion, or all, of pulley 22. The object passthrough window (such as 46 or 69) may be comprised of any structure or combination of structures, having any shape that allows for passage of the object (such as, for example, item 16) through the object passthrough window (such as 46 or 69). Further, pulley 22 outer circumference groove 61 may be configured, oriented or disposed so as to open into object passthrough window 46, allowing the object (such as, for example, item 16) to pass through object passthrough window (such as 46 or 69) and around pulley 22 as line 18 passes around pulley 22, and pulley 22 rotates about axis of rotation A. In embodiments, pulley 22 may be rotatably attached to the housing structure via a rotatable attachment between said pulley and said housing structure such as, for example, via bearings 100, which allow pulley 22 to rotate about axis A.

Still referring to the non-limiting exemplary use case in which the inventive pulley system is configured as a drive pulley for a lure coursing system depicted in FIGS. 4-8, in embodiments, the housing structure may comprise a housing cover (such as, for example and not by way of limitation, item 41, see FIGS. 4 and 6) hingedly attached to a housing base (such as, for example and not by way of limitation, item 42, see FIGS. 4 and 6) via a hinged attachment. In embodiments, the hinged attachment between the cover 41 and base 42 may be configured to allow for the opening and closing of the pulley housing cover 41 without disturbance of the pulley. In this manner the hinged attachment between the housing cover 41 and housing base 42 may allow for opening of the cover, providing access to outer circumference pulley groove 61 so that a line 18 may be wrapped around pulley 22, or removed from pulley 22, as may be required for operation of the pulley system.

In embodiments, the object passthrough window (such as 46 or 69) may further be defined as comprising an annular passage through the housing structure allowing the object 16 to pass through the housing structure as line 18 passes around pulley 22 while pulley 22 is rotating, as shown in exemplary fashion in FIGS. 4-8. In the use case in which the pulley system is a transfer pulley of a lure coursing system, the annular passage through the housing structure allowing object 16 to pass through the housing structure as line 18 passes around pulley 22 while pulley 22 is rotating, is depicted in exemplary fashion as item 69 as shown in FIGS. 10 and 12.

Still referring to the non-limiting exemplary use case in which the inventive pulley system is configured as a drive pulley for a lure coursing system depicted in FIGS. 4-8, in embodiments, when housing cover 41 is in a closed position as depicted in FIGS. 4, 6 and 7, object passthrough window 46 may be further defined as comprising an annular passage through the housing structure allowing the object (such as, for example, item 16) to pass through the housing structure as the line passes around pulley 22 while pulley 22 is rotating about axis A, on its rotatable attachment to the housing structure.

Still referring to the non-limiting exemplary use case in which the inventive pulley system is configured as a drive pulley for a lure coursing system depicted in FIGS. 4-8, in embodiments, the pulley housing cover may include an inwardly beveled pulley shield such as depicted as item 62 (see FIG. 7). The structure forming the object passthrough window (such as 46 or 69) may comprise a substantially solid, or, in other words, substantially continuous, inner surface 56 comprised of pulley groove 61 and the inwardly beveled pulley shield 62. "Substantially solid", "substantially continuous" and "substantially enclosed" as used herein includes within their meanings that the inner surface (such as, for example, item 56 formed by the combination of pulley groove 61 and the inwardly beveled pulley shield 62) does not contain openings, passthroughs, or voids large enough to allow line 18 to enter into such openings, passthroughs, or voids during operation, causing binding of line 18 between pulley 22 and pulley shield 44, or allowing line 18 to become entangled with support shaft 51 as line 18 passes through the housing structure. The object passthrough window 46 may be further defined as comprising an annular passage through the housing structure, allowing an object 16 to pass through the housing structure as the line passes around pulley 22 while said pulley 22 is rotating.

While the object passthrough window is described herein, for convenience, by referring to item 46 of FIGS. 4-8 as having a substantially solid, or, in other words, substantially continuous, inner surface 56 comprised of pulley groove 61 and the inwardly beveled pulley shield 62, it is to be understood that the scope of the invention includes any equivalent structure having an inwardly beveled surface such as inwardly beveled pulley shield 62. In embodiments the object passthrough window may, but does not necessarily, comprise other surfaces such as outer surface 55 (see FIG. 6) such that the object passthrough window (such as 46) may comprise a substantially enclosed cross section as depicted in FIG. 6.

In exemplary use cases and embodiments, the pulley system may be configured as a drive pulley configuration in which pulley 22 is operatively connected to a controllable motor such as motor 20 (such as depicted in a lure coursing exemplary use case embodiment in FIGS. 4-9). In other exemplary use cases and embodiments, the pulley system may be configured as a transfer pulley, in which pulley 22 is able to rotate freely on its axis A (such as depicted in a lure coursing exemplary use case embodiment in FIGS. 10-12). These are merely examples of the many embodiments of the pulley system of the invention.

The pulley system of the invention is useful in any use case in which it is desired to provide a pulley system that allows a line to pass around a pulley while the pulley is rotating, and also, at the same time, allow an object attached to the line to pass around the pulley and through a window in a pulley housing, such that the object passes through the window without impediment. Thus, the pulley system of the invention has industrial application in rigging, sailing, lure coursing (as depicted in exemplary fashion in the drawings) and many other use cases and applications.

The various embodiments of the invention may comprise any of the features or elements described herein, or depicted in the accompanying drawings, or both, in any quantity and in any combination.

All publications, patents, and patent applications mentioned in this specification are herein incorporated by reference to the same extent as if each individual publication, patent, or patent application was specifically and individually indicated to be incorporated by reference. However, the citation of a reference herein should not be construed as an acknowledgement that such reference is prior art to the present invention.

Although the invention has been described with reference to the above examples and embodiments, it is not intended that such references be constructed as limitations upon the scope of this invention except as set forth in the following claims.

What is claimed is:

1. A pulley system for allowing passage of an object attached to a line passing around a pulley, comprising:
   a pulley attached to a housing structure via a rotatable attachment, said pulley having an axis of rotation;
   said pulley comprising an outer circumference having a circumferential groove for retaining a line passing around said pulley while said pulley is rotating; and
   a structure forming an object passthrough window adjacent to said outer circumference for allowing passage of an object attached to said line through said object passthrough window as said line passes around said pulley while said pulley is rotating;
   wherein said housing structure encloses at least a portion of said pulley; and
   wherein said circumferential groove opens into said object passthrough window; and
   wherein said pulley housing includes an inwardly beveled pulley shield.

2. The pulley system of claim 1, wherein said object passthrough window is further defined as comprising an annular passage through said housing structure allowing the object to pass through said housing as said line passes around said pulley while said pulley is rotating.

3. The pulley system of claim 2, wherein said housing structure comprises a housing cover hingedly attached to a housing base via a hinged attachment, wherein said hinged attachment is configured to allow for the opening and closing of the pulley housing cover without disturbance of the pulley.

4. The pulley system of claim 3, wherein said structure forming an object passthrough window comprises a substantially solid inner surface comprised of said circumferential groove and the inwardly beveled pulley shield.

5. The pulley system of claim 1, wherein said housing structure comprises a housing cover hingedly attached to a housing base via a hinged attachment, wherein said hinged attachment is configured to allow for the opening and closing of the pulley housing cover without disturbance of the pulley.

6. A pulley system for allowing passage of an object attached to a line passing around a pulley, comprising:
   a pulley attached to a housing structure via a rotatable attachment, said pulley having an axis of rotation;
   said pulley comprising an outer circumference having a circumferential groove for retaining a line passing around said pulley while said pulley is rotating; and
   a structure forming an object passthrough window adjacent to said outer circumference for allowing passage of an object attached to said line through said object passthrough window as said line passes around said pulley while said pulley is rotating;
   wherein said housing structure encloses at least a portion of said pulley;
   wherein said circumferential groove opens into said object passthrough window; and wherein said housing structure comprises a housing cover hingedly attached to a housing base via a hinged attachment, wherein said hinged attachment is configured to allow for the opening and closing of the pulley housing cover without disturbance of the pulley.

7. The pulley system of claim 6, wherein said pulley housing includes an inwardly beveled pulley shield.

8. The pulley system of claim 7, wherein said structure forming an object passthrough window comprises a substantially solid inner surface comprised of a pulley groove and the inwardly beveled pulley shield.

9. The pulley system of claim 8, wherein said object passthrough window is further defined as comprising an annular passage through said housing structure allowing said object to pass through said housing structure as said line passes around said pulley while said pulley is rotating.

10. The pulley system of claim 6, wherein said object passthrough window is further defined as comprising an annular passage through said housing structure allowing said object to pass through said housing structure as said line passes around said pulley while said pulley is rotating.

11. A pulley system for allowing passage of an object attached to a line passing around a pulley, comprising:
a pulley attached to a housing structure via a rotatable attachment, said pulley having an axis of rotation;
said pulley comprising an outer circumference having a circumferential groove for retaining a line passing around said pulley while said pulley is rotating; and
a structure forming an object passthrough window adjacent to said outer circumference for allowing passage of an object attached to said line through said object passthrough window as said line passes around said pulley while said pulley is rotating;
wherein said housing structure encloses at least a portion of said pulley;
wherein said circumferential groove opens into said object passthrough window; and
wherein said object passthrough window is further defined as forming an annular passage through said housing structure allowing the object to pass through said housing structure as said line passes around said pulley while said pulley is rotating.

12. The pully system of claim 11, wherein said pulley housing includes an inwardly beveled pulley shield.

13. The pulley system of claim 12, wherein said structure forming an object passthrough window comprises a substantially solid inner surface comprised of a pulley groove and the inwardly beveled pulley shield.

14. The pulley system of claim 13, wherein said housing structure comprises a housing cover hingedly attached to a housing base via a hinged attachment, wherein said hinged attachment is configured to allow for the opening and closing of the pulley housing cover without disturbance of the pulley.

15. A pulley system for allowing passage of an object attached to a line passing around a pulley, comprising:
a pulley attached to a housing structure via a rotatable attachment between said pulley and said housing structure, said pulley having an axis of rotation;
said pulley comprising an outer circumference having a circumferential groove for retaining a line passing around said pulley while said pulley is rotating; and
a structure forming an object passthrough window adjacent to said outer circumference for allowing passage of an object attached to said line through said object passthrough window as said line passes around said pulley while said pulley is rotating;
wherein said housing structure encloses at least a portion of said pulley;
wherein said wherein said circumferential groove opens into said object passthrough window object passthrough window;
wherein said housing structure comprises a housing cover hingedly attached to a housing base via a hinged attachment, wherein said hinged attachment is configured to allow for the opening and closing of the pulley housing cover without disturbance of the pulley; and
wherein said pulley is operatively connected to a controllable motor.

16. The pulley system of claim 15, wherein said object passthrough window is further defined as comprising an annular passage through said housing structure allowing said object to pass through said housing structure as said line passes around said pulley while said pulley is rotating.

17. The pulley system of claim 15, wherein said pulley housing includes an inwardly beveled pulley shield.

18. The pulley system of claim 16, wherein said structure forming an object passthrough window comprises a substantially solid inner surface comprised of a pulley groove and the inwardly beveled pulley shield.

19. The pulley system of claim 17, wherein said window is further defined as comprising an annular passage through said housing structure allowing said object to pass through said housing structure as said line passes around said pulley while said pulley is rotating.

20. The pulley system of claim 11, wherein said housing structure comprises a housing cover hingedly attached to a housing base via a hinged attachment, wherein said hinged attachment is configured to allow for the opening and closing of the pulley housing cover without disturbance of the pulley.

* * * * *